US010616024B2

(12) United States Patent
Park et al.

(10) Patent No.: US 10,616,024 B2
(45) Date of Patent: Apr. 7, 2020

(54) METHOD AND APPARATUS FOR SCHEDULING DATA CHANNEL IN NEW RADIO

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/357,686

(22) Filed: Mar. 19, 2019

(65) Prior Publication Data

US 2019/0215212 A1   Jul. 11, 2019

Related U.S. Application Data

(63) Continuation of application No. 15/985,883, filed on May 22, 2018, now Pat. No. 10,284,404.

(30) Foreign Application Priority Data

May 26, 2017 (KR) .................. 10-2017-0065387
Jun. 29, 2017 (KR) .................. 10-2017-0082568
Apr. 30, 2018 (KR) .................. 10-2018-0050090

(51) Int. Cl.
*H04L 27/26* (2006.01)
*H04L 5/00* (2006.01)
*H04W 72/04* (2009.01)

(52) U.S. Cl.
CPC .......... *H04L 27/2613* (2013.01); *H04L 5/005* (2013.01); *H04L 5/0007* (2013.01);
(Continued)

(58) Field of Classification Search
CPC ... H04L 27/2613; H04L 5/005; H04L 5/0094; H04L 5/0007; H04W 72/042; H04W 72/0453; H04W 72/1278
See application file for complete search history.

(56) References Cited

U.S. PATENT DOCUMENTS

2012/0106472 A1   5/2012  Rosa et al.
2013/0021926 A1   1/2013  Geirhofer et al.
(Continued)

FOREIGN PATENT DOCUMENTS

JP        5755758 B2     7/2015

OTHER PUBLICATIONS

Huawei et al., "Resource allocation and indication for data channel", R1-1705069, 3GPP TSG RAN WG1 Meeting #88 bis, Spokane, USA, Apr. 3-7, 2017, pp. 1-8.

*Primary Examiner* — Kabir A Timory
(74) *Attorney, Agent, or Firm* — IP Legal Services, LLC

(57) ABSTRACT

Disclosed are a method and apparatus for scheduling a data channel to support a user equipment (UE) using various bandwidth parts (BWPs) in a next-generation/5G radio access network. According to one embodiment, a method may be provided for receiving a downlink (DL) data channel or transmitting an uplink (UL) data channel by a user equipment (UE). The method may include: receiving bandwidth part (BWP) setup information about a BWP set configured with one or more BWPs set up with regard to the UE from a base station (BS); and receiving DL control information (DCI) including information for indicating one among the one or more BWPs included in the BWP set configured by the BWP setup information from the BS, wherein a DL data channel is received or a UL data channel is transmitted through the one BWP indicated by the DCI.

18 Claims, 7 Drawing Sheets

(a) Bandwidth part configuration UE #1

(b) Bandwidth part configuration UE #2

(52) U.S. Cl.
CPC ......... *H04L 5/0094* (2013.01); *H04W 72/042* (2013.01); *H04W 72/0453* (2013.01)

(56) References Cited

U.S. PATENT DOCUMENTS

| | | |
|---|---|---|
| 2013/0028182 A1 | 1/2013 | Geirhofer et al. |
| 2016/0021661 A1 | 1/2016 | Yerramalli et al. |
| 2017/0201968 A1* | 7/2017 | Nam ........................ H04W 4/70 |
| 2017/0250787 A1 | 8/2017 | Geirhofer et al. |
| 2018/0220400 A1* | 8/2018 | Nogami ................ H04L 5/0078 |

* cited by examiner

METHOD AND APPARATUS FOR SCHEDULING DATA CHANNEL IN NEW RADIO

CROSS REFERENCE TO RELATED APPLICATION

The present application is continuation application of U.S. patent application Ser. No. 15/985,883 (filed on May 22, 2018), which claims priority under 35 U.S.C. § 119 to Korean Patent Application Nos. 10-2017-0065387 (filed on May 26, 2017), and 10-2017-0082568 (filed on Jun. 29, 2017), and 10-2018-0050090 (filed on Apr. 30, 2018).

BACKGROUND OF THE INVENTION

1. Field of the Invention

The present disclosure relates to a method and apparatus for scheduling a data channel to support a user equipment (UE) using various bandwidth parts (BWPs) in a next-generation/5G radio access network (hereinafter, referred to as a new radio (NR)).

2. Description of the Prior Art

Recently, the 3$^{rd}$ generation partnership project (3GPP) has approved the "Study on New Radio Access Technology", which is a study item for research on next-generation/5G radio access technology. On the basis of such a study item, Radio Access Network Working Group 1 (RAN WG1) has been discussing frame structures, channel coding and modulation, waveforms, and multiple access methods for a new radio (NR). NR is required to be designed not only to provide an improved data transmission rate as compared with that of long term evolution (LTE)/LTE-Advanced, but also to satisfy various requirements in detailed and specific usage scenarios.

An enhanced mobile broadband (eMBB), massive machine-type communication (mMTC), and ultra reliable and low latency communication (URLLC) are proposed as typical usage scenarios for the NR. In order to meet the requirements of the individual scenarios, it is required to design flexible frame structures when compared to those of LTE/LTE-Advanced.

In particular, when a UE of the NR uses various BWPs, there is an increasing need of setting up a specific and efficient method by which the terminal can schedule a data channel based on the BWPs.

SUMMARY OF THE INVENTION

Aspects of the present disclosure are directed to providing a method of setting up and activating a BWP for transceiving a data channel between a terminal and a base station (BS) in a next-generation radio network.

According to an aspect of the present disclosure, there is provided a method of receiving a downlink (DL) data channel or transmitting an uplink (UL) data channel by a UE. The method may include: receiving BWP setup information from a BS wherein the BWP setup information is information about a BWP set including one or more BWPs set for the UE; and receiving DL control information (DCI) from the BS, wherein the DCI information includes information for indicating one of BWPs included in the BWP set configured by the BWP setup information from the BS, wherein a DL data channel is received or a UL data channel is transmitted through the one BWP indicated by the DCI.

According to another aspect of the present disclosure, there is provided a method of transmitting a DL data channel or receiving a UL data channel by a BS. The method may include: transmitting BWP setup information to a UE, wherein the BWP setup information is information about a BWP set including one or more BWPs set for the UE; and transmitting DCI to the UE, wherein the DCI includes information for indicating one of the one or more BWPs included in the BWP set based on the BWP setup information, wherein a DL data channel is transmitted or a UL data channel is received through the one BWP indicated by the DCI.

According to still another aspect of the present disclosure, there is provided a UE for receiving a DL data channel or transmitting an uplink UL data channel. The UE may include a receiver configured to receive BWP setup information about a BWP set configured with one or more BWPs set up with regard to the UE from a BS and receive DCI including information for indicating one of BWPs included in the BWP set based on the BWP setup information from the BS, wherein a DL data channel is received or a UL data channel is transmitted through the one BWP indicated by the DCI.

According to yet another aspect of the present disclosure, there is provided a BS for transmitting a DL data channel or receiving a UL data channel. The BS may include: a controller configured to generate BWP setup information about a BWP set including one or more BWPs set for a UE; and a transmitter configured to transmit the BWP setup information to a UE wherein the BWP setup information is information about the BWP set including one or more BWPs set for a UE to the UE and transmits DCI including information to the UE, wherein the DCI is information for indicating one of the one or more BWPs included in the BWP set based on the BWP setup information to the UE, wherein a DL data channel is transmitted or a UL data channel is received through the one BWP indicated by the DCI.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
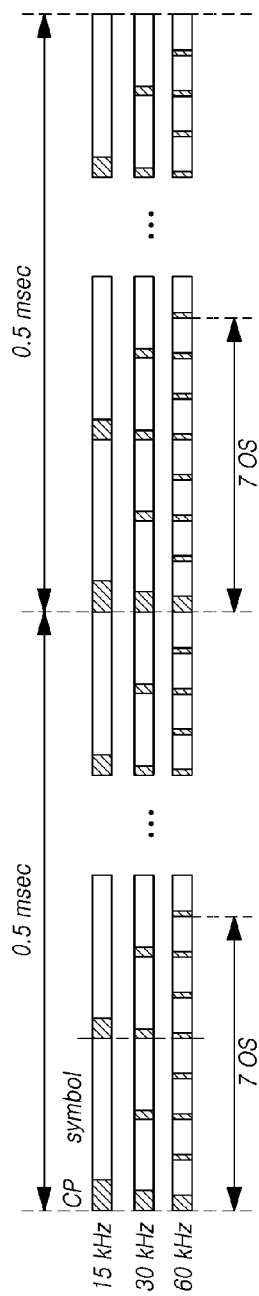
FIG. 1 illustrates arrangements of orthogonal frequency division multiple (OFDM) symbols when subcarrier spacings, which are different from each other, are used according to embodiments.

Hereinafter, embodiments of the present disclosure will be described in detail with reference to the accompanying drawings. In adding reference numerals to elements in each drawing, the same elements may be designated by the same reference numerals although the same elements are shown in different drawings. Further, in the following description of the present disclosure, detailed descriptions of functions and configurations related to the known structure may be omitted when it is determined that the descriptions may obscure the gist of the present disclosure.

In the present disclosure, a wireless communication system refers to a system for providing various communication services such as a voice service, a packet data service, etc. The wireless communication system may include a user equipment (UE) and a base station (BS).

The UE may be a comprehensive concept that indicates a terminal for use in wireless communication, including a UE used for wideband code division multiple access (WCDMA), long term evolution (LTE), high speed packet access (HSPA), international mobile telecommunications (IMT)-2020 (5G or new radio), or the like, and a mobile station (MS), a user terminal (UT), a subscriber station (SS), a wireless device, or the like used for a global system for mobile communications (GSM).

The BS or a cell generally refers to a station where communication with a UE is performed. The BS or cell inclusively means all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the above-described various cells has a BS that controls a corresponding cell, and thus, the BS may be construed in two ways. 1) The BS may be a device that provides the megacell, the macrocell, the microcell, the picocell, the femtocell, and the small cell in association with a wireless area, or 2) the BS may indicate the wireless area itself. In item 1), the BS may be any device that interacts with another device to enable the device that provides a predetermined wireless area to be controlled by an identical entity or to cooperatively configure the wireless area. Based on a configuration type of the wireless area, the BS may be a point, a transmission/reception point, a transmission point, a reception point, or the like. In item 2), the BS may be the wireless area itself that receives or transmits a signal from a perspective of the UE or a neighboring BS.

In the present disclosure, the cell may refer to the coverage of a signal transmitted from the transmission/reception point, a component carrier having the coverage of the signal transmitted from the transmission/reception point (transmission point or transmission/reception point), or the transmission/reception point itself.

In the present disclosure, the UE and the BS are used as two (uplink and downlink) inclusive transceiving subjects to embody the technology and technical concepts described in the specifications. However, the BS and the UE may not be limited to a specific term or word.

Here, a term uplink (UL) refers to a scheme for the UE to transceive data to the BS, and a term downlink (DL) refers to a scheme for the BS to transceive data to the UE.

UL transmission and DL transmission may be performed using i) a time division duplex (TDD) scheme that performs transmission based on different times, ii) a frequency division duplex (FDD) scheme that performs transmission based on different frequencies, or iii) a mixed scheme of the TDD and FDD schemes.

Further, in the wireless communication system, a standard may be developed by forming a UL and a DL based on a single carrier or a pair of carriers.

The UL and the DL may transmit control information through a control channel, such as a physical DL control channel (PDCCH), physical UL control channel (PUCCH), and the like. The UL and the DL may be configured as a data channel, such as a physical DL shared channel (PDSCH), physical UL shared channel (PUSCH), and the like, to transmit data.

The DL may refer to communication or a communication path from a multi-transmission/reception point to the UE, and the UL may refer to communication or the communication path from the UE to a multi-transmission/reception point. In the DL, a transmitter may be a part of multiple transmission/reception points and a receiver may be a part of the UE. In the UL, a transmitter may be a part of the UE and a receiver may be a part of multiple transmission/reception points.

Hereinafter, a situation in which signals are transmitted and received through a channel such as the PUCCH, the PUSCH, the PDCCH, or the PDSCH will be expressed as the transmission and reception of the PUCCH, the PUSCH, the PDCCH, or the PDSCH.

Meanwhile, higher layer signaling includes a radio resource control (RRC) signaling that transmits RRC information including an RRC parameter.

The BS performs DL transmission to the UEs. The BS may transmit a physical DL control channel for transmitting DL control information such as scheduling required to receive a DL data channel, which is a main physical channel for unicast transmission, and scheduling approval information for transmission on a UL data channel. Hereinafter, transmission and reception of a signal through each channel will be described as transmission and reception of a corresponding channel.

Varied multiple access schemes may be unrestrictedly applied to the wireless communication system. Various multiple access schemes, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, and the like may be used. Here, NOMA includes sparse code multiple access (SCMA), low cost spreading (LDS), and the like.

Embodiments of the present disclosure may be applicable to resource allocation in an asynchronous wireless communication scheme that evolves into LTE/LTE-advanced and IMT-2020 through GSM, WCDMA, and HSPA and may be applicable to resource allocation in a synchronous wireless communication scheme that evolves into CDMA, CDMA-2000, and UMB.

In the present disclosure, an machine type communication (MTC) UE refers to a UE that is low cost (or low complexity), a UE that supports coverage enhancement, or the like. Alternatively, in the present disclosure, the MTC UE refers to a UE that is defined in a predetermined category for maintaining low costs (or low complexity) and/or coverage enhancement.

In other words, in the present disclosure, the MTC UE may refer to a newly defined 3GPP Release-13 low cost (or low complexity) UE category/type which executes LTE-based MTC related operations. Alternatively, in the present disclosure, the MTC UE may refer to a UE category/type that is defined in or before 3GPP Release-12 that supports the enhanced coverage in comparison with the existing LTE coverage or supports low power consumption, or may refer to a newly defined Release-13 low cost (or low complexity) UE category/type. Alternatively, the MTC UE may refer to a further enhanced MTC UE defined in Release-14.

In the present disclosure, a narrowband Internet of Things (NB-IoT) UE refers to a UE supporting radio access for cellular IoT. NB-IoT technology is aimed at indoor coverage improvement, support for large-scale low-speed UEs, low latency sensitivity, very low UE costs, low power consumption, and optimized network architecture.

An enhanced mobile broadband (eMBB), massive machine-type communication (mMTC), and ultra reliable and low latency communication (URLLC) are proposed as typical usage scenarios for NR which have been under discussion in the 3GPP in recent years.

In the present disclosure, a frequency, a frame, a subframe, a resource, a resource block (RB), a region, a band, a sub-band, a control channel, a data channel, a synchronization signal, various reference signals, various signals, and various messages associated with NR may be interpreted as meanings used in the past or present or as various meanings to be used in the future.

NR

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

NR is required to be designed not only to provide a data transmission rate improved as compared with that of LTE/LTE-Advanced, but also to satisfy various requirements in detailed and specific usage scenarios. In particular, an eMBB, mMTC, and URLLC have been given as representative usage scenarios of the NR, and it has been required to design more flexible frame structures as compared with those for LTE/LTE-Advanced in order to satisfy the requirements of each individual scenario.

Specifically, the eMBB, mMTC and URLLC have been taken into account for the representative usage scenarios of the NR being discussed in the 3GPP. Since the usage scenarios are different from one another in terms of requirements for data rates, latency, coverage, etc., necessity for a method of efficiently multiplexing radio resource units based on different kinds of numerology (e.g., a subcarrier spacing (SCS), a subframe, a transmission time interval (TTI), etc.) has been proposed as a method of efficiently satisfying requirements according to usage scenarios through a frequency band of a NR system.

To this end, there have been discussions about a method of multiplexing and supporting numerology having different values of SCS based on TDM, FDM or TDM/FDM through one NR carrier, and a method of supporting one or more time units in forming scheduling units in a time domain. In this regard, the NR has defined a subframe as one kind of time domain structure, and a single subframe duration configured with 14 OFDM symbols of 15 kHz SCS-based normal CP overhead like the LTE as reference numerology to define the corresponding subframe duration. Therefore, the subframe in the NR may have a time duration of 1 ms. However, unlike the LTE, the subframe of the NR may have a slot and a mini-slot defined as an actual UL/DL data scheduling-based time unit, which is an absolute reference time duration. In this case, the number of OFDM symbols for forming the corresponding slot, i.e., a value of y, has been defined as y=14 regardless of the numerology.

Therefore, a slot may include 14 symbols. In accordance with transmission directions for the corresponding slot, any of the symbols may be used for DL transmission or UL transmission, or the symbols may be used in the form of a DL portion+a gap+a UL portion.

Further, a mini-slot configured with fewer symbols than those of the corresponding slot may be defined in numerology (or SCS), and a short time domain scheduling interval for transmitting and receiving UL/DL data may be set based on the mini-slot. Also, a long time domain scheduling interval for transmitting and receiving UL/DL data may be configured by slot aggregation.

Particularly, in the case of transmitting and receiving latency critical data like the URLLC, when the scheduling is performed in units of slots based on 0.5 ms (7 symbols) or 1 ms (14 symbols) defined in a frame structure based on the numerology having a small SCS value like 15 kHz, latency requirements may be difficult to satisfy with the scheduling. To this end, the mini-slot having fewer OFDM symbols than those of the corresponding slot is defined, and thus the scheduling for the latency critical data like the URLLC may be performed based on the mini-slot.

Further, as described above, there has been discusssions about a method of scheduling data in accordance with latency requirements based on the length of the slot (or mini-slot) defined in each individual numerology by using the TDM or FDM method to multiplex and support the numerology having different SCS values within one NR carrier. For example, as shown in FIG. 1, the length of a symbol for 60 kHz SCS is shortened by a fourth of that for 15 kHz SCS, and thus a 60 kHz-based slot is shortened to have a length of about 0.125 ms as compared with a 15 kHz-based slot having a length of 0.5 ms under the same condition that one slot is configured with seven OFDM symbols.

As described above, a method of satisfying each requirement of URLLC and eMBB has been under discussion by defining different SCS or different TTI length in the NR.

Wider Bandwidth Operations

The typical LTE system supports a scalable bandwidth operation with regard to a LTE component carrier (CC). That is, in accordance with frequency deployment scenarios, a LTE business operator configures a bandwidth within a range of the minimum of 1.4 MHz to the maximum of 20 MHz in terms of configuring one LTE CC, and therefore a normal LTE UE supports a transceiving bandwidth capability of 20 MHz with respect to one LTE CC.

Figure 2:
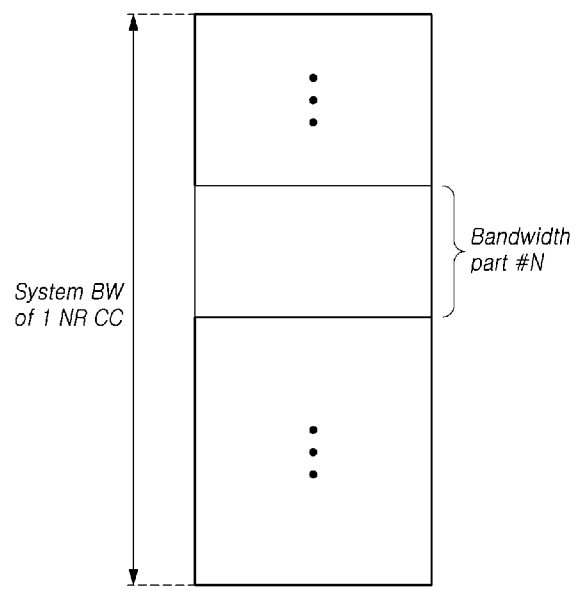
FIG. 2 illustrates a conceptual example of a bandwidth part (BWP) according to an embodiment.

On the other hand, the NR has been designed to support NR UEs having different transceiving bandwidth capabilities with respect to one NR CC, and thus the NR is required to configure one or more BWPs divided into many bandwidths with respect to a certain NR CC and set and activate the BWPs differently according to the UEs to thereby support a flexible wider bandwidth operation as shown in FIG. 2.

Like this, it may be defined that a NR CC may be divided into one or more BWPs, the one or more BWPs are configured for each individual UE, and a UL/DL radio signal and channel for a UE is transceived by activating at least one BWP among one or more BWPs configured for the corresponding UE.

Further, when a plurality of numerologies (e.g., SCS, CP length, etc.) are supported in a NR CC, transceiving numerologies may be set differently according to the BWPs.

Figure 3:
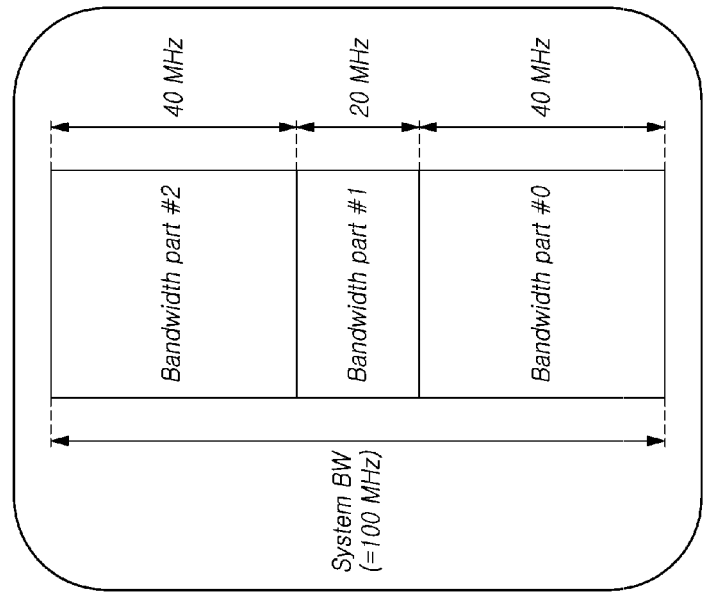
FIG. 3 illustrates a conceptual example of setting a user equipment (UE)-specific BWP according to an embodiment.
Figure 3:
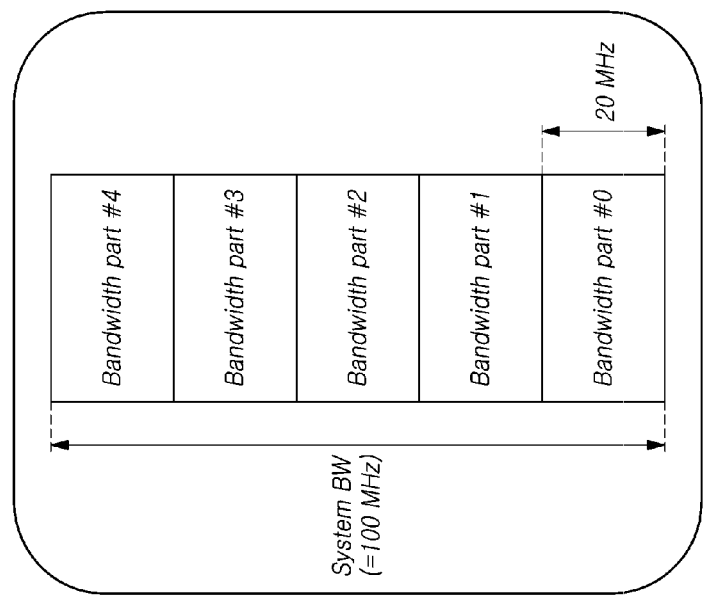

As described above, a NR CC may be configured with one or more BWPs. In terms of configuring the BWPs in a certain NR CC, the corresponding BWPs may be configured based on a UE-specific or cell-specific configuration. In other words, the BWPs may be configured differently according to the UEs as shown in FIG. 3, or the BWPs may be configured equally for all the UEs with respect to a NR CC. However, FIG. 3 merely shows an example, and the specific bandwidth of the NR CC and the bandwidth for each BWP are not to be construed as limiting the present embodiments.

When the BWPs are configured for a NR CC, UL/DL BWPs for communication between the UE and the BS may be configured to a certain time instance by activation of DL BWPs for PDSCH/PUSCH transmission and reception and activation of UL BWPs for PUCCH/PUSCH transmission and reception between the BS and the UE among the configured BWPs.

Specifically, one or more BWPs may be set up for a UE in a NR CC. As an example of setting up the BWP for the UE, the BWP may be set up independently of the DL BWP and the UL BWP. Therefore, a UE may perform reception for a DL physical signal and a physical channel through one or more DL BWPs activated by a BS/network among one or more DL BWPs set up for the UE. Likewise, a UE performs transmission for a UL physical signal and a physical channel to the BS through one or more UL BWPs activated by the BS/network among one or more UL BWPs set up for the UE.

The embodiments set forth herein may even be applied to a UE, a BS and a core network entity (or mobility management entity (MME)) which employs all mobile communication technologies. For example, the embodiments may be applied to a next-generation mobile communication (5G mobile communication or New-RAT) UE, a BS and a core network entity (access and mobility function (AMF)) as well as a mobile communication UE employing the LTE technology. For convenience of description, the BS may refer to an eNB of LTE/E-UTRAN, or the BS may refer to a gNB and a BS (i.e., a central unit (CU), a distributed unit (DU), or the CU and the DU may be provided as a logical entity) in the 5G radio network where the CU and the DU are separated.

Further, the numerology described in present disclosure refers to a numerical characteristic and a numerical value about data transmission/reception and may be determined by a value of subcarrier spacing (hereinafter, referred to as 'SCS'). Therefore, the numerology being different may indicate that the SCS of determining the numerology is different.

In addition, a slot length in the present disclosure may be represented by the number of OFDM symbols forming a slot or by a time occupied by the slot. For example, when the numerology based on the SCS of 15 kHz is used, the length of one slot may be represented by 14 OFDM symbols or by 1 ms.

Further, in the present disclosure, the data channel may include a DL data channel for transmission from the BS to the UE (i.e., PDSCH) or a UL data channel for transmission from the UE to the BS (i.e., PUSCH), and transceiving for the data channel between the UE and the BS may refer to reception for the DL data channel from the BS to the UE or transmission for the UL data channel from UE to the BS.

Below, various embodiments of a specific BWP activation method for supporting BWB-based PDSCH/PUSCH scheduling in a NR CC and a method of configuring scheduling control information based on the specific BWP activation method will be described in more detail. The embodiments set forth herein may be applied individually or in a combination thereof.

Embodiment #1. Details on BWP Activation

With regard to a DL BWP set up for a UE, a BS/network may be defined to support the BWP activation commonly applied to all DL physical signals and physical channels. That is, a UE may be expected to receive the DL physical channel such as a PDCCH, a PDSCH, etc. and the DL physical signal such as a CSI-RS, a DM RS, etc. with regard to all the DL BWPs activated by the BS/network. Such an activated BWP may be also called an active BWP.

In this case, the UE may be defined to perform monitoring on at least one control resource set (CORESET) set up for the PDCCH reception according to the DL BWPs activated by the BS/network.

In addition, it may be defined that the activation of the DL BWP is implemented by MAC CE signaling or L1 control signaling. Further, it may be defined that the activation of the DL BWP is implemented by UE-specific/cell-specific higher layer signaling.

As another method of activating the DL BWP for a UE, it may be defined that one or more DL BWPs for PDCCH reception including scheduling DL control information (DCI) and one or more DL BWPs for PDSCH reception are separately set up by the BS/network and activated. That is, it may be defined that the activation of the BWP for receiving the PDSCH is performed separately from the activation of the DL BWP for the PDCCH among sets of DL BWPs set up for a UE.

According to one embodiment, it may be defined that one or more BWPs including the CORESET to be monitored for the PDCCH reception in a UE among the BWPs set up for the UE in the BS/network are activated through MAC CE signaling. That is, the DL BWP including at least one CORESET (i.e. to be monitored for the PDCCH reception in a UE among the DL BWPs set up for the UE) is activated by the BS/network through MAC CE signaling or L1 control signaling.

Further, the DL BWP for transceiving the PDSCH for the UE, in which PDSCH resource assignment is performed through DL assignment DCI transmitted through the DL BWP for the PDCCH reception, is activated by the BS/network separately from the DL BWP activation for the PDCCH reception. In this case, it may be defined that the DL BWP for the PDSCH reception is activated through separate information region of the same MAC CE signaling or L1 control signaling as that of the DL BWP for the PDCCH reception, or activated through separate MAC CE signaling or L1 control signaling (e.g. DL assignment DCI).

As another method of setting up or activating the BWP for the PDCCH reception and setting up or activating the BWP for the PDSCH reception, the BWP for the PDCCH reception may be defined to be set up or activated through the UE-specific or cell-specific higher layer signaling, and the BWP for the PDSCH reception may be defined to be activated through combination of the DL assignment DCI or MAC CE signaling or MAC CE signaling and DL assignment DCI.

Specifically, it may be defined that the DL BWP for a UE to receive the PDCCH is implicitly set by setting up the CORESET for the UE through the UE-specific higher layer signaling or cell-specific higher layer signaling.

That is, it may be defined that the UE is activated with regard to the BWP, of which the CORESET is set up at a monitoring cycle in accordance with the setup information, when the BWP to be monitored for the PDCCH reception in the UE by setting up the CORESET for the PDCCH reception of the UE or information about a frequency resource, the monitoring cycle, etc. is set up. Further, when the BWP for the PDSCH reception is activated, it may be defined to indicate the BWP, in which transmission resources for the PDSCH are explicitly or implicitly assigned through the DL assignment DCI transmitted through the PDCCH and thus activate the DL BWP for the PDSCH reception.

With regard to even the activation of the UL BWP for a UE, a similar concept to that of the DL may be applied. That is, it may be defined to support activation of common UL BWP to be commonly applied to the PUSCH and the PUCCH. In other words, a UE may be defined to performed PUCCH and PUSCH transmission through all the UL BWP activated by the BS/network. In this case, it may be defined that the activation of the common UL BWP is performed through MAC CE signaling or L1 control signaling. Further, it may be defined that the activation of the common UL BWP is performed through UE-specific or cell-specific higher layer signaling.

As another method of activating the UL BWP for a UE, it may be defined that each individual UL BWP for the PUSCH and the PUCCH is activated when the UL BWP for a UE is activated in the BS/network. That is, it may be defined that the BWP for the PUCCH transmission and the BWP for the PUSCH transmission may be separately activated among sets of the UL BWP set up for a UE.

In this case, like the method of setting up the DL BWP for the PDCCH reception and the DL BWP for the PDSCH reception, it may be defined that the UL BWP to which the PUCCH resource is assigned for uplink control information (UPI) transmission and the UL BWP to which the PUSCH resource is assigned for data transmission are separately set up and activated when the BWP for a UE is activated in a BS/network. However, when the UCI is piggybacked and transmitted on the PUSCH, it may be defined that the UCI is transmitted through the UL BWP activated for the PUSCH transmission.

In this case, it may be defined that the UL BWP for the PUSCH and the UL BWP for the PUCCH are activated through separate information regions defined in the same MAC CE signaling or L1 control signaling (e.g. DL assignment DCI, UL grant, etc.) or through separate MAC CE signaling or L1 control signaling (e.g. DL assignment DCI, UL grant, etc.).

As another method of activating the UL BWP for PUSCH transmission separately from the activation of the UL BWP for the PUCCH transmission, it may be defined that the UL BWP for the PUCCH transmission is activated through combination of UE-specific or cell-specific higher layer signaling or L1 control signaling or UE-specific/cell-specific higher layer signaling and L1 control signaling. Further, it may be defined that the UL BWP for the PUSCH transmission is activated through the UE-specific/cell-specific higher layer signaling, MAC CE signaling or L1 control signaling or a combination of the signalings separately from the signaling used in activating the UL BWP for the PUCCH.

Specifically, it may be defined that the setup and activation of the UL BWP for the PUCCH transmission are implicitly performed through PUCCH resource configuration using the UE-specific or cell-specific higher layer signaling for a UE (i.e. The BWP in which PUCCH resources are configured is always activated or activated at a PUCCH transmission cycle or timing), or implicitly activated through PUCCH resource indication using DL assignment DCI, UL grant or the like L1 control signaling (i.e. The BWP for the PUCCH transmission is activated at a time of the PUCCH transmission in a case where the PUCCH resources are assigned through the L1 control signaling).

Further, it may be defined that the UL BWP for the PUSCH transmission implicitly or explicitly include the UL BWP assignment information for transmitting the PUSCH through the UL grant, and the UL BWP for the PUSCH transmission is activated through the BWP assignment information included in the UL grant.

However, the UL BWP for PRACH and SRS transmission may be activated separately from the activation of the common UL BWP for the PUCCH/PUSCH transmission.

Specifically, in a case of activating the UL BWP for the SRS transmission, it may be defined to follow all the UL BWPs activated for the PUCCH transmission or PUSCH transmission for the UE. That is, regardless of the method of activating the PUSCH/PUCCH BWP defined in the NR, it may be defined that the SRS transmission in a UE is possible through all the UL BWPs activated for the PUCCH or PUSCH transmission in the UE.

Specifically, when the SRS transmission resources are periodically or aperiodically configured with regard to all the UL BWPs set up for a UE, and a BWP is activated for at least PUCCH or PUSCH transmission, it may be defined that the periodically or aperiodically configured or indicated SRS can be transmitted through the activated UL BWP.

Further, it may be defined that the SRS can be transmitted through all the BWPs set up for a UE regardless of activation of the UL BWP for the PUCCH/PUSCH transmission and without separate activation of the UL BWP for the SRS transmission.

Further, it may be defined that the BWP for the SRS transmission is activated by the BS/network through MAC CE signaling or L1 control signaling separately from the UL BWP activated for the PUSCH/PUCCH transmission.

Further, it may be defined that the UL BWP for the SRS transmission only is set up or activated by the BS/network in addition to the UL BWP activated for the PUSCH/PUCCH transmission. That is, it may be defined to support the SRS it) transmission through the UL BWP activated for the PUSCH/PUCCH transmission in a UE and set up or activate an additional UL BWP for the SRS transmission besides the UL BWP activated for the PUCCH/PUSCH transmission of the UE in the BS/network.

Further, it may be defined that the UL BWP for each individual UE-specific or cell-specific SRS transmission in the BS/network is set up through UE-specific higher layer signaling or cell-specific higher layer signaling, regardless of setting up or activating the UL BWP for the PUSCH/PUCCH.

In addition, when aperiodic SRS transmission using the PDCCH is triggered in a UE, it may be defined that the PDCCH includes indication information about the BWP in which the SRS is aperiodically transmitted.

Further, in a case of activating the UL BWP for PRACH transmission, it may be defined to follow all the UL BWPs activated for the PUCCH, PUSCH or SRS transmission of the UE. That is, regardless of the method of activating the BWP for PUSCH/PUCCH and the method of activating the BWP for SRS transmission, which are defined in the NR, it may be defined that the PRACH transmission is possible in a UE through all the UL BWPs activated for the PUCCH/PUSCH or SRS transmission in the UE.

Further, regardless of activation of the UL BWP for the PUCCH/PUSCH or SRS transmission, it may be defined that the PRACH transmission is possible through all the BWPs set up for a UE. Further, it may be defined that the BS/network separately sets up the UL BWP, in which the UE-specific or cell-specific PRACH transmission is possible, through the UE-specific higher layer signaling or cell-specific higher layer signaling. In addition, when PRACH transmission for a UE is performed through the PDCCH, it may be defined that the PDCCH includes indication information about the BWP for the PRACH transmission.

Embodiment #2. Cross BWP Scheduling and Multi-BWPs Scheduling

A BS/network may be defined to set up single BWP scheduling or multi-BWP scheduling when a plurality of DL BWPs or UL BWPs is configured for each individual UE.

The single BWP scheduling may be defined as a scheduling method of giving a restriction that only PDSCH or PUSCH resource assignment is performed within one BWP through single scheduling DCI (e.g. DL assignment DCI, UL grant, etc.). On the other hand, the multi-BWPs scheduling may be defined as a scheduling method of supporting the PDSCH or PUSCH resource assignment using one or more BWPs through single scheduling DCI (e.g. DL assignment DCI, UL grant, etc.).

In addition, when the single BWP scheduling is used, a linkage-based BWP scheduling method in which a semi-static linkage is defined between a DL BWP for the same scheduling DCI transmission and a DL or UL BWP for the corresponding PDSCH or PUSCH transmission, and a cross BWP scheduling method of dynamically supporting PDSCH or PUSCH transmission resource assignment using different DL or UL BWPs by the scheduling DCI transmitted through a DL BWP may be defined, and it may be defined to set the methods in the BS/network.

The configurations may be set up through the higher layer signaling or may be performed by the MAC CE signaling or L1 signaling.

Embodiment #2-1. Cross BWP Scheduling

When a plurality of DL BWPs is activated with regard to a UE, in particular, when a plurality of DL BWPs is activated for transceiving the PDSCH, there is a need for defining a linkage between the DL BWP for PDSCH transmission of the UE and the DL BWP for PDCCH transmission including scheduling control information for the PDSCH.

The present disclosure proposes a cross BWP scheduling method in which PDSCH transmission for a UE and PDCCH transmission including scheduling control information about the PDSCH are performed using different BWPs in accordance with an embodiment.

To this end, it may be defined to set up a BWP indication field (BIF) value corresponding to each DL BWP through higher layer signaling when the DL BWP is set up for a UE in the BS/network or set up a BIF value corresponding to each DL BWP through activation signaling (e.g. MAC CE signaling or L1 control signaling) when activation is performed with regard to a DL BWP.

Likewise, with regard to the UL BWP, it may be defined to set up a BIF value corresponding to each UL BWP through higher layer signaling when the UL BWP is set up for a PUSCH or PUCCH transmission according to UL BWPs in the BS/network, or set up a BIF value corresponding to each UL BWP through activation signaling (e.g. MAC CE signaling or L1 control signaling) when activation is performed with regard to a UL BWP.

Therefore, when the cross BWP scheduling is supported, DL assignment DCI or UL grant for the UE is configured to include an information region indicating the BIF. However, the cross BWP scheduling may be defined to be set up by the BS/network through the higher layer signaling and MAC CE signaling according to the UE. In this case, the DL assignment DCI or UL grant for the UE is configured to include the information region for indicating the BIF only when the cross BWP scheduling is set up.

On the other hand, when the cross BWP scheduling is not supported, the PDCCH including a DL assignment DCI and the corresponding PDSCH are transmitted through the same DL BWP. Further, in a case of the UL BWP, it may be defined to transmit PUSCH transmission resource assignment information of the UL BWP, i.e., transmit DL BWP indication information about the PDCCH including the UL grant, through higher layer signaling for setting up each individual UL BWP in the BS/network, through MAC CE signaling, or L1 control signaling for activation of the UL BWP.

Alternatively, it may be defined to transmit the UL BWP indication information linked for PUSCH, PUCCH, PRACH, or SRS transmission according to each individual DL BWP through higher layer signaling for setting up each individual DL BWP in the BS/network (or DL BWP for the PDCCH transmission) or through MAC CE signaling or L1 control signaling for activating the DL BWP (or the DL BWP for the PDCCH transmission).

Specifically, linkage indication information about the UL BWP according to each individual DL BWP may refer to UL BWP indication information for PUSCH transmission indicated by UL grant transmitted through each individual DL BWP, and UL BWP indication information for transmission of the UCI, PRACH, or SRS to be triggered through the DL BWP.

Embodiment #2-2. Multi-BWPs Scheduling

PDSCH or PUSCH transmission for a UE may be defined to support multi-BWPs scheduling performed through a plurality of DL BWPs or a plurality of BWPs within the same time slice. The multi-BWPs scheduling may be set up by the BS through the UE-specific higher layer signaling, MAC CE signaling, or L1 control signaling according to the UE.

Further, it may be defined that the multi-BWPs scheduling may be implicitly set up when a plurality of DL BWPs (or DL BWPs for transmitting a plurality of PDSCHs) or a plurality of UL BWPs (or UL BWPs for transmitting a plurality of PUSCHs) is set up or activated for a UE.

Therefore, when multi-BWPs scheduling is set up in a UE, DL assignment DCI or UL grant for the UE may be defined to include a bitmap-based indication information region according to DL/UL BWPs set up or activated for transceiving the PDSCH or PUSCH. It is defined that bits of configuring a bitmap for indicating the DL or UL BWP are one-to-one mapped to one DL BWP or UL BWP to indicate whether PDSCH or PUSCH resources are assigned or not through the DL BWP or the UL BWP.

Thus, it may be defined that frequency resource (in units of PRB or RBG) assignment information regions and time domain resource assignment information regions of the DL assignment DCI or UL grant are commonly applied to the indicated DL BWP or UL BWP when a DL BWP or UL BWP is indicated by a bitmap information region included in DL assignment DCI or UL grant for a UE.

Further, the multi-BWPs scheduling may be applied in the form of BWP aggregation. That is, with regard to a plurality of DL BWPs or UL BWPs set up for a UE, it may be defined to activate a plurality of DL BWPs or UL BWPs among the plurality of DL BWPs or UL BWPs, and make the BS/network set up BWP aggregation of a plurality of DL BWPs or UL BWPs among the activated DL BWPs or UL BWPs.

In this case, it may be defined that the PRB assignment information region included in the DL assignment DCI or UL grant for the UE is set up by the BS and analyzed by the UE on the basis of the PRBs included in all the DL BWPs or UL BWPs to which aggregation is set up.

In this case, one TB assigned by one DCI (in case of single codeword scheduling) or two or more TBs (in case of multiple codewords scheduling) may be transmitted throughout the plurality of DL or UL BWPs in accordance with pieces of PRB assignment information. The BWP aggregation may be configured by the BS/network through the UE-specific higher layer signaling, MAC CE signaling or L1 control signaling.

In addition, when the BWP aggregation for a UE is applied, the cross BWP scheduling method may be used for scheduling the PDSCH or PUSCH with regard to the aggregated DL BWP or UL BWP.

That is, DL BWP linkage information for the transmission of PDSCH or PUSCH scheduling control information for the aggregated DL BWP or the aggregated UL BWP may be configured in the BS/network, or one BIF value is assigned for the BWP aggregated by the BS/network when the BWP aggregation is configured so that the BIF value can be indicated through the DCI.

Figure 4:
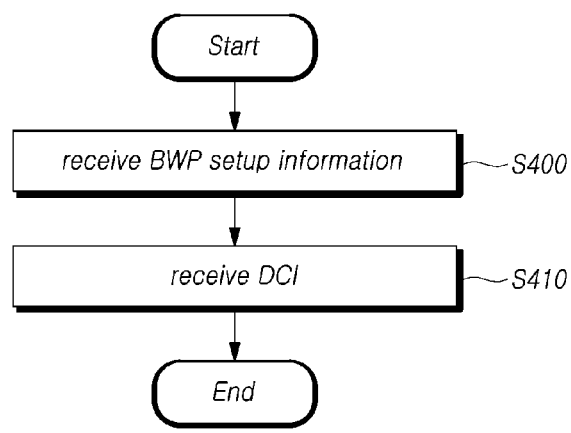
FIG. 4 illustrates a method of a UE for receiving a downlink (DL) data channel or transmitting a uplink (UL) data channel according to an embodiment.

FIG. 4 illustrates a method of a UE for receiving a DL data channel or transmitting a UL data channel according to an embodiment.

Referring to FIG. 4, the UE may receive BWP setup information from a BS (S400). The BWP setup information refers to information about a BWP set that includes at least one of BWPs for the UE.

In this case, the BWP setup information may, for example, include index information for indicating each one of the BWPs included in a corresponding BWP set.

Alternatively, the BWP setup information may additionally include subcarrier spacing (SCS) information and a cyclic prefix (CP) for each BWP of the BWP set.

In this case, each BWP of the BWP set may be configured based on common RB indexing information about CCs formed by the BS. Here, the CC may refer to a NB CC or a WB CC and may refer to one or more CCs forming carrier aggregation (CA).

The same common RB indexing information may be shared between all the UEs using the same CC. In other words, single RB indexing may be applied regardless of whether a CC is based on single numerology or multiplexed based on multiple numerology.

Specifically, configuration information about each of the BWPs may include a starting RB index, i.e., a start point of the BWP based on the common RB indexing information. Such a starting physical RB index may be represented in units of PRB index based on the common RB indexing. Further, the configuration information about each of the BWPs may additionally include information about the starting RB index based on the common RB indexing information and information about the size of the BWP.

Further, the UE may receive the BWP setup information from the BS through the higher layer signaling (e.g. RRC signaling).

Further, the UE may receive DCI, which indicates one of BWPs included in the BWP set, from the BS on the basis of the BWP setup information received in the operation S400 (S410). Through one BWP indicated by the DCI received from the BS, the UE may receive a DL data channel from the BS or transmit a UL data channel to the BS. In this case, only one BWP may be set in a specific time stage as a BWP indicated by the BWP setup information, and the indicated BWP may be changed according to preset time slices.

In this case, the maximum number of DL BWPs and the maximum number of UL BWPs which are useable by the UE may be set up to N (where N is a natural number greater than or equal to one). For example, in a case of N=4, four different pieces of information may be represented with at most 2 bits. Therefore, a bit number corresponding to the information for indicating the BWP in the DCI may be one bit or two bits.

Further, the UE may determine the bit number of information for indicating the BWP in the DCI in accordance with the number of BWPs configured for the UE by the higher layer signaling, i.e. the BWP setup information. That is, the bit number of BWP indication information in the DCI is one bit when the number of BWPs configured for a UE by the BWP setup information received from the BS is less than or equal to two, and the bit number of BWP indication information in the DCI is two bits when the number of BWPs configured for a UE is greater than two.

Among the maximum number of N DL BWPs, one initial DL BWP may be set for monitoring the CORESET in the common search space of Type0-PDCCH. Further, among the maximum number of N UL BWPs, one initial UL BWP may be set for random access.

That is, before the operation S400, the initial DL BWP and the initial UL BWP are determined, and one of the BWPs in the BWP set for the UE may be set with the initial DL BWP or the initial UL BWP.

In this case, when the UE detects an SS block transmitted from the BS as one method of determining the initial DL BWP and the initial UL BWP, the initial DL BWP and the initial UL BWP may be determined on the basis of the frequency information of the detected SS Block. The initial DL and UL BWPs are activated in an initial access stage, and then the BWP for receiving a DL data channel from the BS or transmitting a UL data channel to the BS is changeable after the maximum number of N DL and UL BWPs are set up with respect to the UE.

In addition, the UE may be configured to receive a PDSCH through only one BWP indicated in the DCI. Further, the PDCCH and the RS (e.g. CSI-RS, TRS) may also be configured to be received through only one BWP indicated in the DCI.

Figure 5:
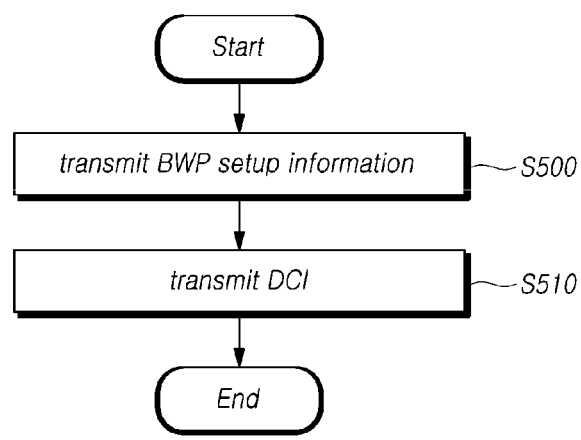
FIG. 5 illustrates a method of a base station (BS) for transmitting a DL data channel or receiving a UL data channel according to the embodiment.

FIG. 5 illustrates a method of a BS for transmitting a DL data channel or receiving a UL data channel according to an embodiment.

Referring to FIG. 5, the BS may transmit BWP setup information to a UE (S500). The BWP setup information refers to information about a BWP set including one or more BWPs for the UE.

In this case, the BWP setup information may, for example, include index information for indicating each one of the BWPs included in the corresponding BWP set.

Alternatively, the BWP setup information may additionally include SCS information and a CP for each BWP of the BWP set.

In this case, each BWP of the BWP set may be configured based on a common RB indexing information about CCs formed by the BS. Here, the CC may refer to a NB CC or a WB CC and may refer to one or more CCs forming CA.

The same common RB indexing information may be shared between all the UEs using the same CC. In other words, single RB indexing may be applied regardless of whether a CC is based on single numerology or multiplexed based on multiple numerology.

Specifically, configuration information about each of the BWPs may include a starting RB index, i.e., a start point of the BWP based on the common RB indexing information. Such a starting physical RB index may be represented in units of PRB index based on the common RB indexing. Further, the configuration information about each of the BWPs may additionally include information about the starting RB index based on the common RB indexing information and information about the size of the BWP. Further, the BS may transmit the BWP setup information to the UE through the higher layer signaling (e.g. RRC signaling).

Further, the BS may transmit DCI, which indicates one of BWPs included in the BWP set, to the UE on the basis of the BWP setup information (S510). Through one BWP indicated by the DCI, the BS may transmit a DL data channel to the UE or receive a UL data channel from the UE. In this case, only one BWP may be set in a specific time stage as a BWP indicated by the BWP setup information, and the indicated BWP may be changed according to preset time slices.

In this case, the maximum number of DL BWPs and the maximum number of UL BWPs which are useable by the UE may be set up to N (where N is a natural number greater than or equal to one). For example, in a case of N=4, four different pieces of information may be represented with at most two bits. Therefore, a bit number corresponding to the information for indicating the BWP in the DCI may be one bit or two bits.

Further, the BS may determine the bit number of information for indicating the BWP in the DCI in accordance with the number of BWPs configured for a UE by the higher layer signaling, i.e. the BWP setup information. That is, the bit number of BWP indication information in the DCI is one bit when the number of BWPs configured for a UE is less than or equal to two, and the bit number of BWP indication information in the DCI is two bits when the number of BWPs configured for a UE is greater than two.

Among the maximum number of N DL BWPs, one initial DL BWP may be set for monitoring the CORESET in the common search space of Type0-PDCCH. Further, among the maximum number of N UL BWPs, one initial UL BWP may be set for random access.

That is, before the operation S500, the initial DL BWP and the initial UL BWP are determined, and one of the BWPs in the BWP set configured with one or more BWPs set with regard to the UE may be set with the initial DL BWP or the initial UL BWP.

In this case, when the UE detects an SS block transmitted from the BS as one method of determining the initial DL BWP and the initial UL BWP, the initial DL BWP and UL BWP may be determined on the basis of the frequency information of the detected SS Block. The initial DL and UL BWPs are activated in an initial access stage, and then the BWP for receiving a DL data channel from the BS or transmitting a UL data channel to the BS is changeable after the maximum number of N DL and UL BWPs are set up with respect to the UE.

In addition, the BS may be configured to transmit a PDSCH through only one BWP indicated in the DCI. Further, the PDCCH and the RS (e.g. CSI-RS, TRS) may also be configured to be transmitted through only one BWP indicated in the DCI.

Figure 6:
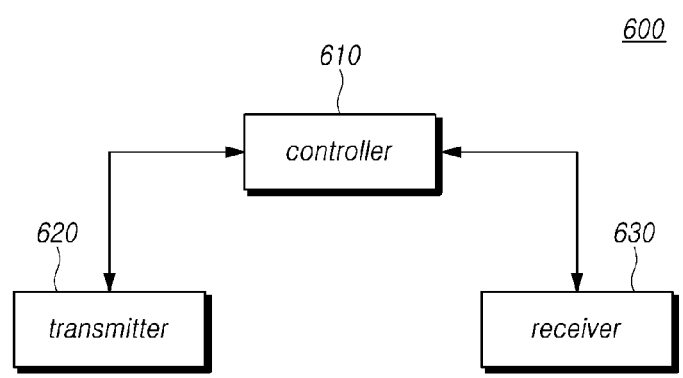
FIG. 6 illustrates a BS according to embodiments.

FIG. 6 illustrates a BS according to embodiments.

Referring to FIG. 6, a BS 600 includes a controller 610, a transmitter 620, and a receiver 630.

The controller 610 may configure BWP setup information about a BWP set configured with one or more BWPs for the UE.

In this case, the BWP setup information may, for example, include index information for indicating each BWP of the BWP set including one or more BWPs for the UE. Further, the BS may transmit the BWP setup information to the UE through higher layer signaling (e.g. RRC signaling).

The transmitter 620 and the receiver 630 are used in transmitting and receiving a signal, a message or data needed for materializing the present disclosure to and from the UE.

Specifically, the transmitter 620 transmits the BWP setup information to the UE, and transmits DCI, which includes information for indicating one among one or more BWPs included in the BWP set on the basis of the BWP setup information, to the UE.

Through one BWP indicated by the DCI, the BS may transmit the DL data channel to the UE or receive the UL data channel from the UE.

In this case, the maximum number of DL BWPs and the maximum number of UL BWPs which are useable by the UE may be set up to N (where N is a natural number greater than or equal to one). For example, in a case of N=4, four different pieces of information may be represented with at most two bits. Therefore, a bit number corresponding to the information for indicating the BWP in the DCI may be one bit or two bits.

Further, the BS may determine the bit number of information for indicating the BWP in the DCI in accordance with the number of BWPs configured for a UE by the higher layer signaling, i.e. the BWP setup information. That is, the bit number of BWP indication information in the DCI is one bit when the number of BWPs configured for a UE is less than or equal to two, and the bit number of BWP indication information in the DCI is two bits when the number of BWPs configured for a UE is greater than two. Among the maximum number of N DL BWPs, one initial DL BWP may be set for monitoring the CORESET in the common search space of Type0-PDCCH. Further, among the maximum number of N UL BWPs, one initial UL BWP may be set for random access.

That is, the initial DL BWP and the initial UL BWP are determined, and one of the BWPs in the BWP set configured with one or more BWPs set with regard to the UE may be set with the initial DL BWP or the initial UL BWP.

In this case, when the UE detects an SS block transmitted from the BS as one method of determining the initial DL and UL BWPs, the initial DL BWP and the initial UL BWP may be determined on the basis of the frequency information of the detected SS Block. The initial DL and UL BWPs are activated in an initial access stage, and then the BWP for receiving a DL data channel from the BS or transmitting a UL data channel to the BS is changeable after the maximum number of N DL and UL BWPs are set up with respect to the UE.

In addition, the BS may be configured to transmit a PDSCH through only one BWP indicated in the DCI. Further, the PDCCH and the RS (e.g. CSI-RS, TRS) may also be configured to be transmitted through only one BWP indicated in the DCI.

Figure 7:
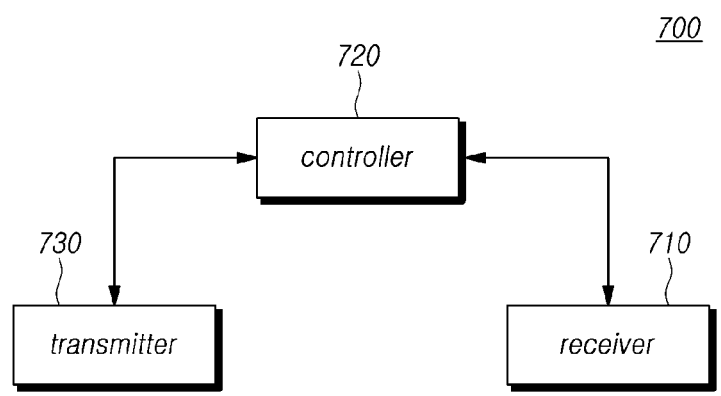
FIG. 7 illustrates a UE according to embodiments.

FIG. 7 illustrates a UE according to embodiments.

Referring to FIG. 7, a UE 700 includes a receiver 710, a controller 720, and a transmitter 730.

The receiver 710 may receive the BWP setup information about the BWP set including one or more BWPs for the UE from the BS and receive DCI including information for indicating one of BWPs included in the BWP set from the BS on the basis of the received BWP setup information.

The UE may receive a DL data channel from the BS or transmit a UL data channel to the BS through one BWP indicated in the DCI received from the BS.

In this case, the BWP setup information may include index information for indicating each BWP of the BWP set including one or more BWPs for the UE. Further, the UE may receive the BWP setup information from the BS through higher layer signaling (e.g. RRC signaling).

Further, the maximum number of DL BWPs and the maximum number of UL BWPs which are useable by the UE may be set up to N (where N is a natural number greater than or equal to one). For example, in a case of N=4, four different pieces of information may be represented with at most two bits. Therefore, a bit number corresponding to the information for indicating the BWP in the DCI may be one bit or two bits.

Further, the UE may determine the bit number of information for indicating the BWP in the DCI in accordance with the number of BWPs configured for a UE by the higher layer signaling, i.e. the BWP setup information. That is, the bit number of BWP indication information in the DCI is one bit when the number of BWPs configured for a UE by the BWP setup information received from the BS is less than or equal to two, and the bit number of BWP indication information in the DCI is two bits when the number of BWPs configured for a UE is greater than two. Among the maximum number of N DL BWPs, one initial DL BWP may be set for monitoring the CORESET in the common search space of Type0-PDCCH. Further, among the maximum number of N UL BWPs, one initial UL BWP may be set for random access.

That is, the initial DL BWP and the initial UL BWP are determined, and one of the BWPs in the BWP set including one or more BWPs for the UE may be set with the initial DL BWP or the initial UL BWP.

In this case, when the UE detects an SS block transmitted from the BS as one method of determining the initial DL and UL BWPs, the initial DL BWP and the initial UL BWP may be determined on the basis of the frequency information of the detected SS Block. The initial DL and UL BWPs are activated in an initial access stage, and then the BWP for receiving a DL data channel from the BS or transmitting a UL data channel to the BS is changeable after the maximum number of N DL and UL BWPs are set up with respect to the UE.

In addition, the UE may be configured to receive a PDSCH through only one BWP indicated in the DCI. Further, the PDCCH and the RS (e.g. CSI-RS, TRS) may also be configured to be received through only one BWP indicated in the DCI.

The controller 720 may control general operations for the UE to transceive the data channel.

According to the embodiments, there is provided a method of setting up and activating a BWP for transceiving a data channel between a UE and a BS in a next-generation radio network.

Standard details or standard documents described in the above embodiments are omitted for simplicity of description of the specification and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit, but are intended to illustrate the technical idea of the present disclosure, and the scope of the technical idea of the present disclosure is not to be limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of receiving a downlink (DL) data channel or transmitting an uplink (UL) data channel by a user equipment (UE), the method comprising:
    receiving bandwidth part (BWP) configuration information from a base station (BS) through higher layer signaling, wherein the BWP configuration information is information about a BWP set including multiple BWPs configured for the UE; and
    receiving DL control information (DCI) from the base station, wherein the DCI comprises information for indicating one BWP to be used for at least one of a DL data channel and a UL data channel, among the BWPs included in the BWP set based on the BWP configuration information,
    wherein the DL data channel is received or the UL data channel is transmitted through the one BWP indicated by the DCI,
    wherein the BWP configuration information comprises subcarrier spacing (SCS) information and a cyclic prefix (CP) for each BWP of the BWP set, and
    wherein the receiving of the BWP configuration information and the receiving of the DCI including BWP indication information are separately performed from each other.

2. The method according to claim 1, wherein the BWP configuration information comprises index information for indicating each BWP of the BWP set.

3. The method according to claim 1, wherein configuration information the BWP set comprises one initial DL BWP configured for a control resource set (CORESET) for the common search space of Type0-PDCCH.

4. The method according to claim 1, wherein a bit number of the information for indicating the one BWP among the BWPs included in the BWP set in the DCI is one bit or two bits.

5. The method according to claim 4, wherein information about the bit number is determined in accordance with a number of BWPs in the BWP configuration information received from the BS through higher layer signaling.

6. The method according to claim 1, wherein the DL data channel is received through only the one BWP indicated by the DCI.

7. A method of transmitting a downlink (DL) data channel or receiving an uplink (UL) data channel by a base station (BS), the method comprising:
- transmitting bandwidth part (BWP) configuration information to a user equipment(UE) through higher layer signaling, wherein the BWP configuration information is information about a BWP set including multiple BWPs configured for the UE; and
- transmitting DL control information (DCI) to the UE, wherein the DCI comprises information for indicating one BWP to be used for at least one of a DL data channel and a UL data channel, among the BWPs included in the BWP set in the BWP configuration information,
- wherein the DL data channel is transmitted or the UL data channel is received through the one BWP indicated by the DCI,
- wherein the BWP configuration information comprises subcarrier spacing (SCS) information and a cyclic prefix (CP) for each BWP of the BWP set,
- wherein the transmitting of the BWP configuration information and the transmitting DCI including BWP indication information are separately performed from each other.

8. The method according to claim 7, wherein the BWP configuration information comprises index information for indicating each one of the BWPs included in the BWP set.

9. The method according to claim 7, wherein configuration information the BWP set comprises one initial DL BWP configured for a control resource set (CORESET) for the common search space of Type0-PDCCH.

10. The method according to claim 7, wherein a bit number of the information for indicating the one BWP among the BWPs included in the BWP set in the DCI is one bit or two bits.

11. The method according to claim 10, wherein information about the bit number is determined based on a number of BWPs in the BWP configuration information which is transmitted to the UE through higher layer signaling.

12. The method according to claim 7, wherein the DL data channel is transmitted through only the one BWP indicated by the DCI.

13. A user equipment (UE) for receiving a downlink (DL) data channel or transmitting an uplink (UL) data channel, the UE comprising
- a receiver configured to receive bandwidth part (BWP) configuration information from a base station (BS) through higher layer signaling and receives DL control information (DCI) from the BS, wherein the BWP configuration information is information on a BWP set including multiple BWPs configured for the UE, and the DCI comprises information for indicating one BWP to be used for at least one of a DL data channel and a UL data channel, among the BWPs included in the BWP set based on the BWP configuration information,
- wherein the DL data channel is received or the UL data channel is transmitted through the one BWP indicated by the DCI,
- wherein the BWP configuration information comprises subcarrier spacing (SCS) information and a cyclic prefix (CP) for each BWP of the BWP set, and
- wherein the receiving of the BWP configuration information and the receiving of the DCI including BWP indication information are separately performed from each other.

14. The UE according to claim 13, wherein the BWP configuration information comprises index information for indicating each one of the BWPs in the BWP set.

15. The UE according to claim 13, wherein configuration information the BWP set comprises one initial DL BWP configured for a control resource set (CORESET) for the common search space of Type0-PDCCH.

16. The UE according to claim 13, wherein a bit number of the information for indicating the one BWP among the BWPs included in the BWP set in the DCI is one bit or two bits.

17. The UE according to claim 16, wherein information about the bit number is determined based on a number of BWPs configured by the BWP configuration information received from the BS through higher layer signaling.

18. The UE according to claim 13, wherein the DL data channel is received through only the one BWP indicated by the DCI.

* * * * *